United States Patent [19]

Nagare et al.

[11] Patent Number: 4,614,015

[45] Date of Patent: Sep. 30, 1986

[54] DEVICE FOR RETAINING/EJECTING A LAMP FROM A SOCKET AND FRAME

[75] Inventors: Arthur T. Nagare; Wolfgang Mueller; Thomas J. Fendya; Joseph T. Sestak, all of Erie, Pa.

[73] Assignee: American Sterilizer Company, Erie, Pa.

[21] Appl. No.: 783,500

[22] Filed: Oct. 2, 1985

[51] Int. Cl.[4] .......... B23P 19/04

[52] U.S. Cl. .......... 29/239; 29/267; 29/270; 339/45 R

[58] Field of Search .......... 29/267, 270, 239; 339/45 R, 45 T, 45 M, 46, 74 R

[56] References Cited

U.S. PATENT DOCUMENTS

| | | | |
|---|---|---|---|
| 1,434,437 | 11/1922 | Hodgkins | 29/267 |
| 2,020,110 | 11/1935 | Duvall | 339/46 |
| 2,551,533 | 5/1951 | Gernheuser | 339/45 R |
| 2,687,567 | 8/1954 | Walrauler | 29/270 |

*Primary Examiner*—Robert C. Watson

*Attorney, Agent, or Firm*—Robert D. Yeager; Christine R. Ethridge

[57] ABSTRACT

A device for stabilizing/ejecting a lamp from a plug-in socket wherein the lamp is mountable in a frame. The device includes a spring member for stabilizing the lamp in the frame and an ejection member pivotally attached to the spring member. The ejection member includes an upper ejector, or cam formed therein for separating the socket from the lamp, an outwardly extending lower ejector for ejecting the lamp from the frame and a lever for sequentially actuating the upper ejector and the lower ejector in one stroke. The stroke moves the lever from a rest position in which the spring member is operative, through a transition position in which the upper ejector is operative to eject the socket from the lamp and to reinforce the spring member to stabilize the lamp during the socket separation. The lever moves from the transition position to a final position in which the lower ejector is operative to eject the lamp from the frame. The spring member includes two prongs spaced from each other to receive a portion of the lamp therebetween to align the lamp relative to the frame.

6 Claims, 7 Drawing Figures

DEVICE FOR RETAINING/EJECTING A LAMP FROM A SOCKET AND FRAME

BACKGROUND OF THE INVENTION

1. Field of the Invention

The present invention relates to devices for retaining and ejecting lamps from sockets and frames.

2. Description of the Prior Art

Lighting fixtures for use in specialized working environments, such as surgical suites, employ single or multiple lamps in one lighting fixture. One commercially available lamp for use in multiple lamp applications includes a tungsten halogen bulb in a glass reflector which superposes and partially circumscribes the bulb. The lamps are positioned in a frame within the lighting fixture. Each lamp includes prongs, similar to those of a plug, for electrical connection to the lighting fixture.

When one or more of the bulbs burn out during use, the lamp may have to be changed while it is still hot. It is necessary to reach into the lighting fixture with a towel or some other means of hand protection, to remove the lamp. Two hands are required, one to remove a retainer holding the lamp in place and the other to remove the lamp. Generally, the available space within which to manipulate is limited, making it awkward to remove the lamp.

One commercially available device retains the lamps and provides an electrical contact. The lamp slides into a three-sided metal bracket. The rim of the reflector fits within a recessed portion surrounding an opening in the bottom of the bracket to position the lamp and the prongs slide into slots in an electrical connector in the top of the bracket. A side portion connects the bottom and top portions of the bracket. A wire clip is provided which runs from one side of the bracket across the lamp to retain the lamp in the bracket.

In order to remove the lamp, the metal clip, which becomes very hot during use, must be unlatched and moved out of the way. The excessive heat and sharp edges of the device pose hazards to personnel. Further, the metal bracket, particularly the side portion, often becomes bent after repeated use, so that the top portion and the electrical connector are not parallel to the bottom portion. Thereafter, when the lamp is inserted into the bracket, if the clip is used to retain the reflector in the recess in the bottom portion, the prongs may fall out of the slot in the connector. If the clip is not used, the electrical contact may be assured but the lamp will not be in alignment with the opening in the bottom of the bracket. Thus, the lamp's positioning in the optical system is not assured. Use of the clip is recommended, however, because movement of the lighting fixture may cause the spring-loaded slide-in contacts of the socket to eject the lamp.

Plug-in sockets are preferred for electrical connection between the lamps and the lighting fixture because the sockets grip the prongs of the lamp better than the slide-in connectors.

There is a need therefore, for a device for retaining a lamp within a lighting fixture securely and in proper alignment. There is a further need for such a device which facilitates use of a plug-in socket to electrically connect the lamp to the lighting fixture. Finally, there is a need for a device which permits the lamp to be ejected from the socket and positioning device easily, quickly and safely.

SUMMARY OF THE INVENTION

The present invention provides a device for retaining and ejecting a lamp from a socket, wherein the lamp has associated therewith a rim which is mountable on a frame of a lighting fixture. The device facilitates use of a plug-in lamp socket for enhanced electrical contact. The device includes means for stabilizing the lamp positioned within the frame and an ejection member adjacent to the lamp. The ejection member includes means for ejecting the socket from the lamp, means for ejecting the lamp from the stabilizing means, and means for sequentially actuating the socket ejecting means and the lamp ejecting means in one stroke. The stroke moves the sequential actuating means, preferably a lever pivotally attached to the stabilizing means, from a rest position in which the stabilizing means is operative through a transition position in which the socket ejecting means and the stabilizing means are operative, to a final position in which the lamp ejecting means is operative.

The socket ejecting means is preferably an upper ejector, such as a raised cam portion formed in the ejection member for pressing against the socket. The raised cam portion is connected to another portion for pressing against the stabilizing means to reinforce the stabilizing means while the socket is being ejected from the lamp. The lamp ejecting means is preferably an outwardly extending lower ejector. The sequential actuating means is preferably a lever pivotally attached to the stabilizing means and operatively attached to the upper and lower ejectors.

Moving the sequential actuating means, or lever, from its rest position through its transition position presses the upper ejector against the socket, thereby ejecting the socket from the lamp, while reinforcing the stabilizing means and moving the lower ejector inwardly towards the lamp. Moving the sequential actuating means to the final position moves the lower ejector against the lamp to eject the lamp from the stabilizing means.

The stabilizing means is preferably a spring member having two fingers to hold the lamp in position. The fingers are spaced from each other to receive a portion of the lamp therebetween for aligning the lamp in a predetermined position relative to the frame. A stop may be incorporated into the stabilizing means to reduce the acceleration of the lamp as it is ejected.

BRIEF DESCRIPTION OF THE DRAWINGS

The present invention can better be understood by reference to the drawings in which.

DETAILED DESCRIPTION OF THE PREFERRED EMBODIMENT

Figure 1:
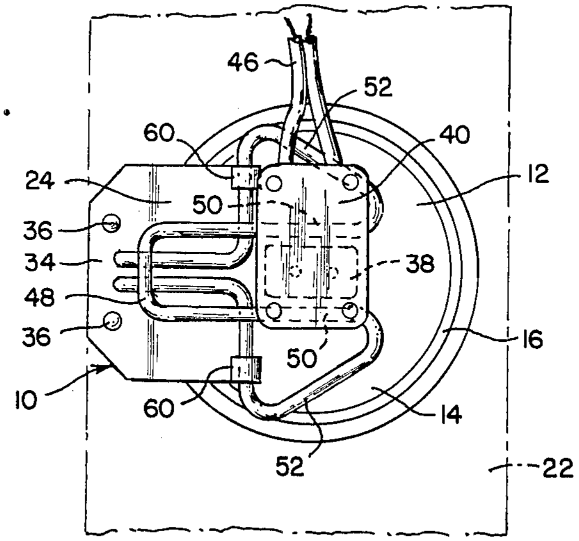
FIG. 1 is a top plan view of the preferred embodiment of the retainer/ejection device of the present invention positioned over a lamp.

FIGS. 1 through 7 illustrate the preferred embodiment of the retainer/ejection device 10 of the present invention. The device 10 is designed for use with lamp 12 which has a tungsten halogen bulb (not shown) within a glass reflector 14. Reflector 14 which superposes and partially circumscribes the bulb, has a rim 16 which rests in a recess 18 surrounding an opening 20 in frame 22 of a lighting fixture (not shown). Frame 22 may be designed to hold multiple lamps 12.

The retainer/ejection device 10 includes a spring member 24 and an ejection member 48. The spring member 24 is a metallic spring member mounted to frame 22, adjacent to lamp 12, by means of tab 34 and fasteners 36. The spring member also includes a side portion 30 and two finger like extensions 26 separated by a space 28 (see FIG. 5) for receiving the top portion 38 of lamp 12 therebetween. The space 28 is sized to align the top portion 38 so that the bulb is properly aligned relative to the frame 22 and the lighting fixture.

The prongs 42 on lamp 12 are also aligned by the space 28 so that socket 40 can easily be electrically connected to the lamp 12. The prongs 42 fit snugly into holes 44 in socket 40. Wires 46 electrically connect socket 40 to the lighting fixture and ultimately to a suitable power source (not shown).

Ejection member 48 is pivotally attached at points 60 to spring member 24 adjacent to lamp 12. Ejection member 48 includes a lever 56, an outwardly extending lower ejector 58 and an upper ejector 54. The upper ejector 54 includes two upper raised cam portions 50, each of which curve down at one end to the lever 56 and at the other end to portion 52. Portion 52 bends back toward pivotal attachment 60 to form the outwardly extending lower ejector 58. While the preferred embodiment of ejection member 48 is formed from a single wire, other embodiments having equivalent operational elements are possible and are included within the scope of the present invention.

Figure 2:
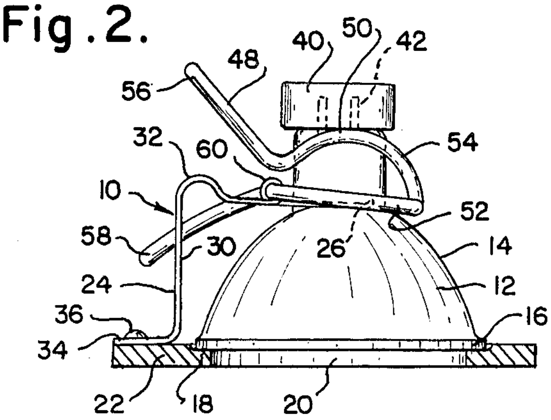
FIG. 2 is a side elevation view of the device and lamp of FIG. 1.
Figure 3:
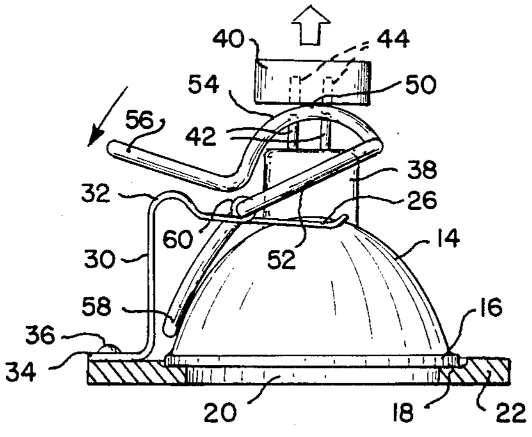
FIG. 3 is a side elevation view of the device and lamp of FIG. 1 showing the upper ejector ejecting the socket.
Figure 4:
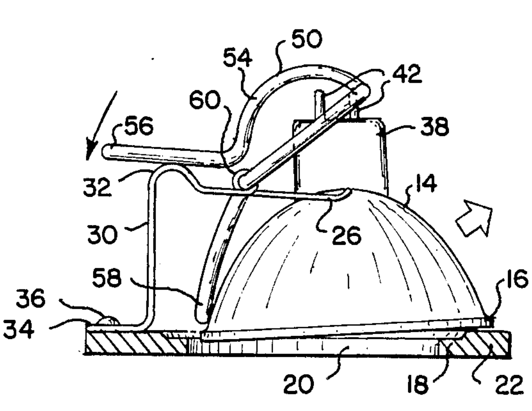
FIG. 4 is a side elevation view of the device and lamp of FIG. 1 showing a lower ejector ejecting the lamp.
Figure 5:
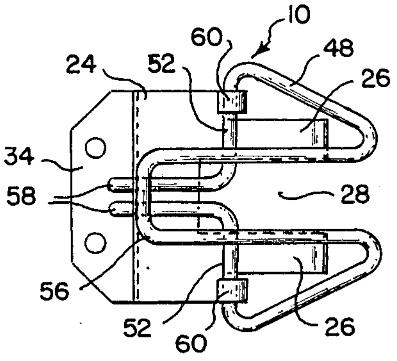
FIG. 5 is a top plan view of the preferred embodiment of the retainer/ejection device of the present invention.
Figure 6:
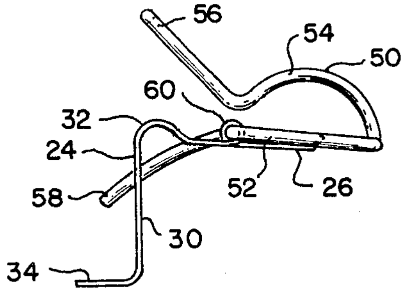
FIG. 6 is a side elevation view of the retainer/ejection device of FIG. 5.
Figure 7:
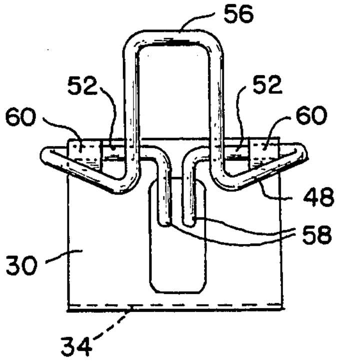
FIG. 7 is a rear elevation view of the retainer/ejection device of FIG. 5.

The lamp 12 is installed by sliding the top portion 38 of lamp 12 into the space 28 between the fingers 26 and positioning rim 16 of reflector 14 into the recess 18 of frame 22. The socket 40 is then pressed onto prongs 42 which extend upwardly from the top portion 38 of lamp 12. The fingers 26 of spring member 24 exert pressure against the upper portion of reflector 14 to retain the lamp 12 in position. FIG. 2 shows the ejection member 48 in a rest position wherein spring member 24 is retaining the lamp 12, the outwardly extending lower ejector 58 is spaced from lamp 12 and cams 50 are curved away from socket 40.

To eject lamp 12, the lever 56 is lowered from the rest position through a transition position (see FIG. 3) in which the upper raised cam portion 50 of upper ejector 54 press against socket 40 to eject the socket from the lamp 12 and the portions 52 near point 60 press against fingers 26 of spring member 24 to reinforce the stabilizing effect of the fingers 26 while the socket 40 is being separated from lamp 12. The outwardly extending lower ejector 58 moves towards lamp 12 but does not apply pressure against it.

With the socket 40 separated from lamp 12, the lever 56 continues through the transition position to the final position (see FIG. 4) wherein the outwardly extending lower ejector 58 is pressed against the reflector 14 of lamp 12 to eject it from the recess 18 and space 28. The portions 52 no longer reinforce spring member 24. An optional stop ring (not shown) may be placed on frame 22 to prevent the lamp 12 from shooting out too far, thus controlling the position of the lamp 12 after it has been ejected. Depending upon the position of the stop ring, nominal retention of the lamp 12 between fingers 26 can be provided. The lamp 12 can now be removed from the lighting fixture with one hand. A raised portion on spring member 24 acts as a stop 32 to interrupt the stroke and reduce the acceleration of lever 56 as it sequentially actuates the upper and lower ejectors 54, 58 of ejection member 48.

The retainer/ejection device 10 provides a means for stabilizing the lamp 12 in the frame 22 and a means for ejecting the lamp 12 in a single stroke of lever 56 by sequentially separating the socket 40 from the lamp 12 while maintaining the lamp 12 in a stabilized position and then ejecting the lamp 12 from the spring member 24 and the recess 18 of frame 22. One finger can be used to depress lever 56 to eject lamp 12. Thereafter, lamp 12 can be easily and safely removed from the lighting fixture. The device 10 facilitates the use of a plug-in socket with a lamp retention/ejection device by making lamp removal easier.

What is claimed is:

1. A device for ejecting a lamp from a socket, wherein. said lamp has associated therewith a rim mountable on a frame, comprising:

means for stabilizing said lamp in said frame; and an ejection member adjacent to said lamp comprising;

- means for ejecting said socket from said lamp;
- means for ejecting said lamp from said stabilizing means; and means for sequentially actuating said socket ejecting means and said lamp ejecting means in one stroke wherein such stroke moves said sequential actuating means from a rest position in which said stabilizing means is operative, through a transition position in which said socket ejecting means and said stabilizing means are operative, to a final position in which said lamp ejecting means is operative.

2. A device as recited in claim 1 wherein said socket ejecting means is an upper ejector, said lamp ejecting means is a lower ejector and said sequential actuating means is a lever pivotally attached to said stabilizing means and so operatively attached to said upper and lower ejectors that moving said lever from its rest position through its transition position presses said upper ejector against said socket, ejecting said socket from said lamp, reinforces said stabilizing means and moves said lower ejector inwardly towards said lamp, and moving said lever from its transition position to its final position moves said lower ejector against said lamp to eject said lamp from said stabilizing means.

3. A device as recited in claim 1 wherein said stabilizing means is a spring member having fingers to hold said lamp in position.

4. A device as recited in claim 3 wherein there are two said fingers spaced from each other to receive a portion of said lamp therebetween for aligning said lamp in a predetermined position relative to said frame.

5. A device as recited in claim 2 wherein said stabilizing means is a spring member having fingers to hold said lamp in position, wherein said upper ejector includes a raised cam portion for pressing upwardly against said socket, said raised cam portion being connected to another portion for pressing downwardly against said fingers when said lever moves through said transition position for reinforcing said spring member, said other portion ceasing to exert pressure against said fingers when said lever moves to said final position.

6. A device as recited in claim 1 wherein said stabilizing means includes a stop for reducing the acceleration of said lamp as said lamp is ejected.

* * * * *